US011271419B2

United States Patent
Toyoda

(10) Patent No.: US 11,271,419 B2
(45) Date of Patent: Mar. 8, 2022

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 287 days.

(21) Appl. No.: 16/086,340

(22) PCT Filed: Apr. 15, 2016

(86) PCT No.: PCT/JP2016/062093
§ 371 (c)(1),
(2) Date: Sep. 19, 2018

(87) PCT Pub. No.: WO2017/179186
PCT Pub. Date: Oct. 19, 2017

(65) Prior Publication Data
US 2019/0089181 A1 Mar. 21, 2019

(51) Int. Cl.
*H02J 7/02* (2016.01)
*H02J 7/00* (2006.01)
(Continued)

(52) U.S. Cl.
CPC ............... *H02J 7/022* (2013.01); *H02J 7/00* (2013.01); *H02J 7/0013* (2013.01); *H02J 9/06* (2013.01); *H02J 7/345* (2013.01)

(58) Field of Classification Search
CPC .... H02J 7/00; H02J 9/06; H02J 7/0013; H02J 7/345; H02J 9/062; H02J 7/022
(Continued)

(56) References Cited

U.S. PATENT DOCUMENTS

2012/0119583 A1* 5/2012 Allfather ............... H02M 7/797
307/72
2013/0154369 A1* 6/2013 Kim ........................ H02J 9/062
307/26
(Continued)

FOREIGN PATENT DOCUMENTS

CN 102437597 A 5/2012
JP 5-64378 A 3/1993
(Continued)

OTHER PUBLICATIONS

Office Action dated Oct. 18, 2019 in corresponding Korean Patent Application No. 10-2018-7026973 (with English Translation), citing document AO therein, 12 pages
(Continued)

*Primary Examiner* — Toan T Vu
(74) *Attorney, Agent, or Firm* — Oblon, McClelland, Maier & Neustadt, L.L.P.

(57) ABSTRACT

An uninterruptible power supply device includes a switch, a power converter, and another power converter. The switch includes a first electrode that receives AC power from an AC power supply and a second electrode connected to a load via an AC bus, and is turned on during a normal operation and turned off during a power failure. The power converter converts DC power from a DC power supply into AC power and outputs it to the AC bus during a power failure. The other power converter converts the AC power received from the AC bus into DC power and stores it in a lithium-ion battery when the load is performing regeneration running, and converts the DC power of the lithium-ion battery into AC power and supplies it to the AC bus when the load is performing power running.

13 Claims, 6 Drawing Sheets

(51) Int. Cl.
*H02J 9/06* (2006.01)
*H02J 7/34* (2006.01)

(58) Field of Classification Search
USPC .............................................. 307/23, 64, 66
See application file for complete search history.

(56) References Cited

U.S. PATENT DOCUMENTS

| | | | | |
|---|---|---|---|---|
| 2015/0236549 A1* | 8/2015 | Budde | ...................... | H02J 9/061 307/23 |
| 2016/0159240 A1* | 6/2016 | Tseng | ...................... | B60L 53/14 320/109 |
| 2016/0214503 A1* | 7/2016 | Orita | ............... | B60W 30/18054 |
| 2017/0232969 A1* | 8/2017 | Hunt | ............... | B60W 30/18054 477/93 |

FOREIGN PATENT DOCUMENTS

| | | |
|---|---|---|
| JP | 11-341686 A | 12/1999 |
| JP | 2001-8459 A | 1/2001 |
| JP | 2010-104173 A | 5/2010 |
| JP | 2012-75274 A | 4/2012 |
| JP | 2012075274 A * | 4/2012 |
| JP | WO 2015/115145 A1 | 8/2015 |

OTHER PUBLICATIONS

Japanese Office Action dated May 28, 2019 in Japanese Patent Application No. 2018-511848 (with English translation), 10 pages.
Indian Office Action dated Dec. 31, 2019 in Indian Patent Application No. 201817041304 (with English translation), 6 pages.
International Search Report dated Jun. 14, 2016 in PCT/JP2016/062093 filed Apr. 15, 2016.
Office Action dated May 6, 2021 in China Patent Application No. 201680083716.X (with English translation); 16 pgs.

* cited by examiner

UNINTERRUPTIBLE POWER SUPPLY DEVICE

TECHNICAL FIELD

The present invention relates to uninterruptible power supply devices, and particularly, to an uninterruptible power supply device of a standby power system.

BACKGROUND ART

Japanese Patent Laying-Open No. 11-341686 (PTD 1) discloses an uninterruptible power supply device of a standby power system. This uninterruptible power supply device includes a switch having a first electrode that receives AC power from a commercial AC power supply and a second electrode connected to a load, and a power converter connected to the load. When the commercial AC power supply supplies AC power normally, the switch is turned on, so that AC power from the commercial AC power supply is supplied to the load via the switch. When the commercial AC power supply does not supply AC power normally, the switch is turned off, so that DC power supplied from a DC power supply is converted into AC power by the power converter and the AC power is supplied to the load.

CITATION LIST

Patent Document

PTD 1: Japanese Patent Laying-Open No. 11-341686

SUMMARY OF INVENTION

Technical Problem

According to PTD 1, at the occurrence of regenerated power in the load, the regenerated power is returned to the commercial AC power supply via the switch. When the uninterruptible power supply device is connected to an independent power generator in place of the commercial AC power supply, however, the regenerated power generated in the load may return to the independent power generator, leading to a failure of the independent power generator.

A main object of the present invention is therefore to provide an uninterruptible power supply device capable of preventing or reducing a return of regenerated power generated in a load to an AC power supply.

Solution to Problem

An uninterruptible power supply device according to the present invention is an uninterruptible power supply device that supplies AC power from an AC power supply to a load in a first case in which the AC power supply supplies AC power normally, and converts DC power from a DC power supply into AC power and supplies the AC power to the load in a second case in which the AC power supply does not supply AC power normally. The uninterruptible power supply device includes a switch, an AC bus, a first power converter, a second power converter, and a control circuit. The switch has a first electrode that receives AC power from the AC power supply, and is configured to be turned on in the first case and turned off in the second case. The AC bus is connected between a second electrode of the switch and the load. The first power converter is configured to convert DC power from the DC power supply into AC power and output the AC power to the AC bus in the second case. The second power converter has a charge mode in which the second power converter converts AC power received from the AC bus into DC power and supplies the DC power to a first power storage device and a discharge mode in which the second power converter converts DC power of the first power storage device into AC power and outputs the AC power to the AC bus. The control circuit is configured to execute a first mode. In the first mode, the control circuit causes the second power converter to execute the charge mode when the load is performing regeneration running and causes the second power converter to execute the discharge mode when the load is performing power running.

Another uninterruptible power supply device according to the present invention is an uninterruptible power supply device that supplies AC power from an AC power supply to a first load in a first case in which the AC power supply supplies AC power normally, and converts DC power from a DC power supply into AC power and supplies the AC power to the first load in a second case in which the AC power supply does not supply AC power normally. The uninterruptible power supply device includes a first terminal, a second terminal, a first switch, an AC bus, a power converter, a second switch, and a control circuit. The first terminal is connected to the first load. The second terminal is connected to a second load caused to consume regenerated power generated in the first load. The first switch has a first electrode that receives AC power from the AC power supply, and is configured to be turned on in the first case and turned off in the second case. The AC bus is connected between a second electrode of the first switch and the first terminal. The power converter is configured to convert DC power from the DC power supply into AC power and output the AC power to the AC bus in the second case. The second switch is connected between the first terminal and the second terminal. The control circuit is configured to execute a first mode. In the first mode, the control circuit turns on the second switch when the first load is performing regeneration running and turns off the second switch when the first load is performing power running.

Advantageous Effects of Invention

In the uninterruptible power supply device according to the present invention, the second power converter is provided between the AC bus and the first power storage device, and the first power storage device is charged during regeneration running of the load. This can prevent or reduce of a return of the regenerated power generated in the load to the AC power supply. Additionally, the first power storage device is discharged during power running of the load, allowing the regenerated power generated in the load to be used effectively, which increases an input efficiency of the uninterruptible power supply device.

In another uninterruptible power supply device according to the present invention, the first switch is connected between the first terminal connected with the first load and the second terminal connected with the second load that consumes the regenerated power generated in the first load, and the first switch is turned on during regeneration running of the first load and the first switch is turned off during power running of the first load. The regenerated power generated in the load can thus be consumed by the second load, preventing or reducing a return of the regenerated power to the AC power supply.

DESCRIPTION OF EMBODIMENTS

Embodiment 1

Figure 1:
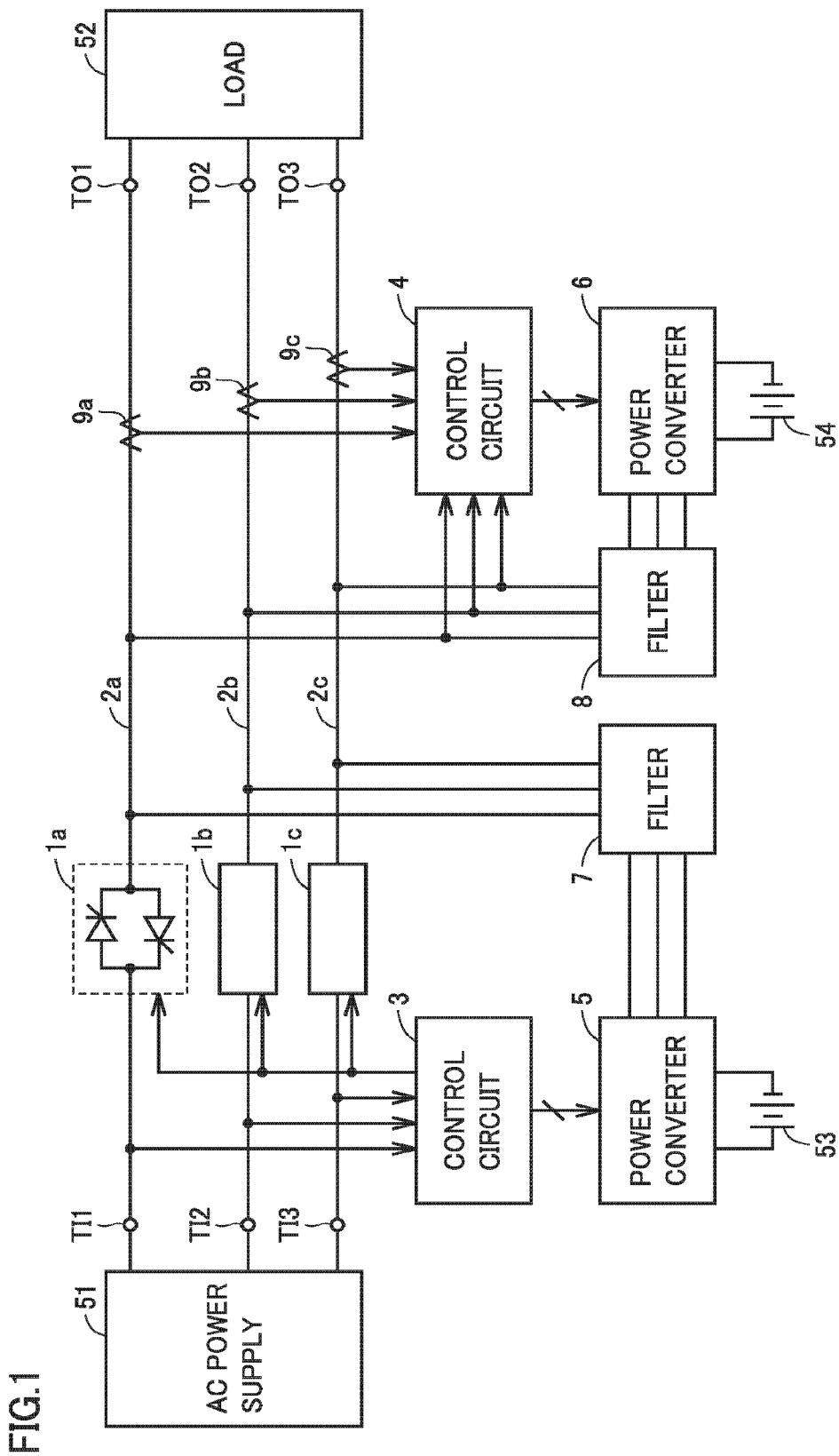
FIG. 1 is a circuit block diagram showing a configuration of an uninterruptible power supply device according to Embodiment 1 of the present invention.

FIG. 1 is a circuit block diagram showing a configuration of an uninterruptible power supply device according to Embodiment 1 of the present invention. With reference to FIG. 1, the uninterruptible power supply device is an uninterruptible power supply device of a standby power system and includes input terminals TI1 to TI3, output terminals TO1 to TO3, switches 1a to 1c, AC buses 2a to 2c, control circuits 3 and 4, power converters 5 and 6, filters 7 and 8, and current detectors 9a to 9c.

Input terminals TI1 to TI3 each receive three-phase AC power supplied from AC power supply 51. AC power supply 51 may be a commercial AC power supply or an independent power generator. AC power supply 51 supplies, for example, AC power of a commercial frequency to the uninterruptible power supply device. Output terminals TO1 to TO3 are connected to a load 52. Load 52 is, for example, a motor and is driven by the AC power supplied from the uninterruptible power supply device. In Embodiment 1, the case in which load 52 is subjected to power running and the case in which load 52 is subjected to regeneration running are performed alternately.

Switches 1a to 1c have first electrodes each connected to a corresponding one of input terminals TI1 to TI3 and second electrodes connected respectively to first terminals of AC buses 2a to 2c, and the second terminals of AC buses 2a to 2c are connected respectively to output terminals TO1 to TO3. Each of switches 1a to 1c includes, for example, a pair of thyristors. One of the pair of thyristors has an anode and a cathode connected respectively to the first electrode and the second electrode, and the other thyristor has an anode and a cathode connected respectively to the second electrode and the first electrode. Each of switches 1a to 1c may be formed of a mechanical switch.

Switches 1a to 1c are controlled by control circuit 3, and are turned on in a normal operation in which AC power supply 51 supplies three-phase AC power normally and are turned off in the case in which AC power supply 51 does not supply three-phase AC power normally (e.g., during a power failure).

Power converter 5 is connected to AC buses 2a to 2c via filter 7 and is also connected to DC power supply 53. DC power supply 53 supplies DC power to power converter 5. Power converter 5 is controlled by a pulse width modulation (PWM) signal supplied from control circuit 3 and is driven by the DC power supplied from DC power supply 53. Power converter 5 is brought to the standby state in which no current is output during the normal operation in which AC power supply 51 supplies three-phase AC power normally.

If an abnormality occurs in the three-phase AC power supplied from AC power supply 51 (e.g., if a power failure occurs), power converter 5 applies a reverse bias voltage to switches 1a to 1c to rapidly turn off switches 1a to 1c, and subsequently, converts the DC power supplied from DC power supply 53 into three-phase AC power and then supplies the three-phase AC power to AC buses 2a to 2c via filter 7.

Filter 7 is provided between power converter 5 and AC buses 2a to 2c. Filter 7, which is a low pass filter, allows three-phase AC power of a commercial frequency to pass therethrough and prohibits a signal of a switching frequency which is generated in power converter 5 from passing therethrough. In other words, filter 7 shapes a rectangular-wave AC voltage generated in power converter 5 into a sine-wave AC voltage.

Control circuit 3 determines whether AC power supply 51 normally supplies three-phase AC power based on the voltages at input terminals TI1 to TI3 (i.e., three-phase AC voltage supplied from AC power supply 51), and controls switches 1a to 1c and power converter 5 based on the determination result.

For example, when the three-phase AC voltage supplied from AC power supply 51 is within an allowable range, control circuit 3 determines that AC power supply 51 supplies three-phase AC power normally. When the three-phase AC voltage supplied from AC power supply 51 deviates from the allowable range, control circuit 3 determines that AC power supply 51 does not supply three-phase AC power normally.

When AC power supply 51 supplies three-phase AC power normally, control circuit 3 turns on switches 1a to 1c and also brings power converter 5 to the standby state. When AC power supply 51 does not supply three-phase AC power normally, control circuit 3 turns off switches 1a to 1c and also causes power converter 5 to generate three-phase AC power.

For example, when AC power supply 51 supplies three-phase AC power normally, control circuit 3 stores the phase and voltage value of the three-phase AC voltage from AC power supply 51. When the three-phase AC power from AC power supply 51 is abnormal, control circuit 3 controls power converter 5 based on the stored phase and voltage value of the three-phase AC voltage.

Power converter 6 is connected to first ends of AC buses 2a to 2c via filter 8 and is also connected to lithium-ion battery 54. Power converter 6 is controlled by a PWM signal supplied from control circuit 4 and gives and receives power between AC buses 2a to 2c and lithium-ion battery 54.

Power converter 6 executes a charge mode when load 52 is performing regeneration running and executes a discharge mode when load 52 is performing power running. During the charge mode, power converter 6 converts the three-phase AC power supplied from AC buses 2a to 2c via filter 8 into DC power and stores the DC power in lithium-ion battery 54. During the discharge mode, power converter 6 converts the DC power of lithium-ion battery 54 into three-phase AC power and outputs the three-phase AC power to AC buses 2a to 2c via filter 8.

Lithium-ion battery 54 is disadvantageous in that it is expensive compared with a storage battery; advantageously, lithium-ion battery 54 deteriorates less due to charging and discharging and can be charged and discharged many times. Lithium-ion battery 54 is thus used as a battery that is charged and discharged every time load 52 is switched between regeneration running and power running.

Filter 8 is provided between power converter 6 and AC buses 2a to 2c. Filter 8, which is a low pass filter, allows three-phase AC power of a commercial frequency to pass therethrough and prohibits a signal of a switching frequency generated in power converter 5 from passing therethrough. In other words, filter 8 shapes a rectangular-wave AC voltage generated in power converter 6 into a sine-wave AC voltage. In addition, filter 8 causes regenerated power generated in load 52 to pass therethrough.

Current detectors 9a to 9c respectively detect the instantaneous values of the currents flowing through the second ends of AC buses 2a to 2c and output signals indicating the detected values. Control circuit 4 controls power converter 6 based on the output signals of current detectors 9a to 9c and the three-phase AC voltages of AC buses 2a to 2c. Control circuit 4 determines whether load 52 is performing regeneration running or power running based on the output signals of current detectors 9a to 9c.

Control circuit 4 subjects three-phase AC currents obtained from the output signals of three current detectors 9a to 9c to three-phase to two-phase conversion (i.e., dq conversion) to obtain an effective current and a reactive current. Control circuit 4 determines that load 52 is performing power running when the effective current has a positive value (i.e., the effective current flows into load 52) and determines that load 52 is performing regeneration running when the effective current has a negative value (i.e., the effective current flows out of load 52).

When load 52 is performing regeneration running, control circuit 4 causes power converter 6 to execute the charge mode to charge lithium-ion battery 54. When load 52 is performing power running, control circuit 4 causes power converter 6 to execute the discharge mode to discharge lithium-ion battery 54.

Figure 2:
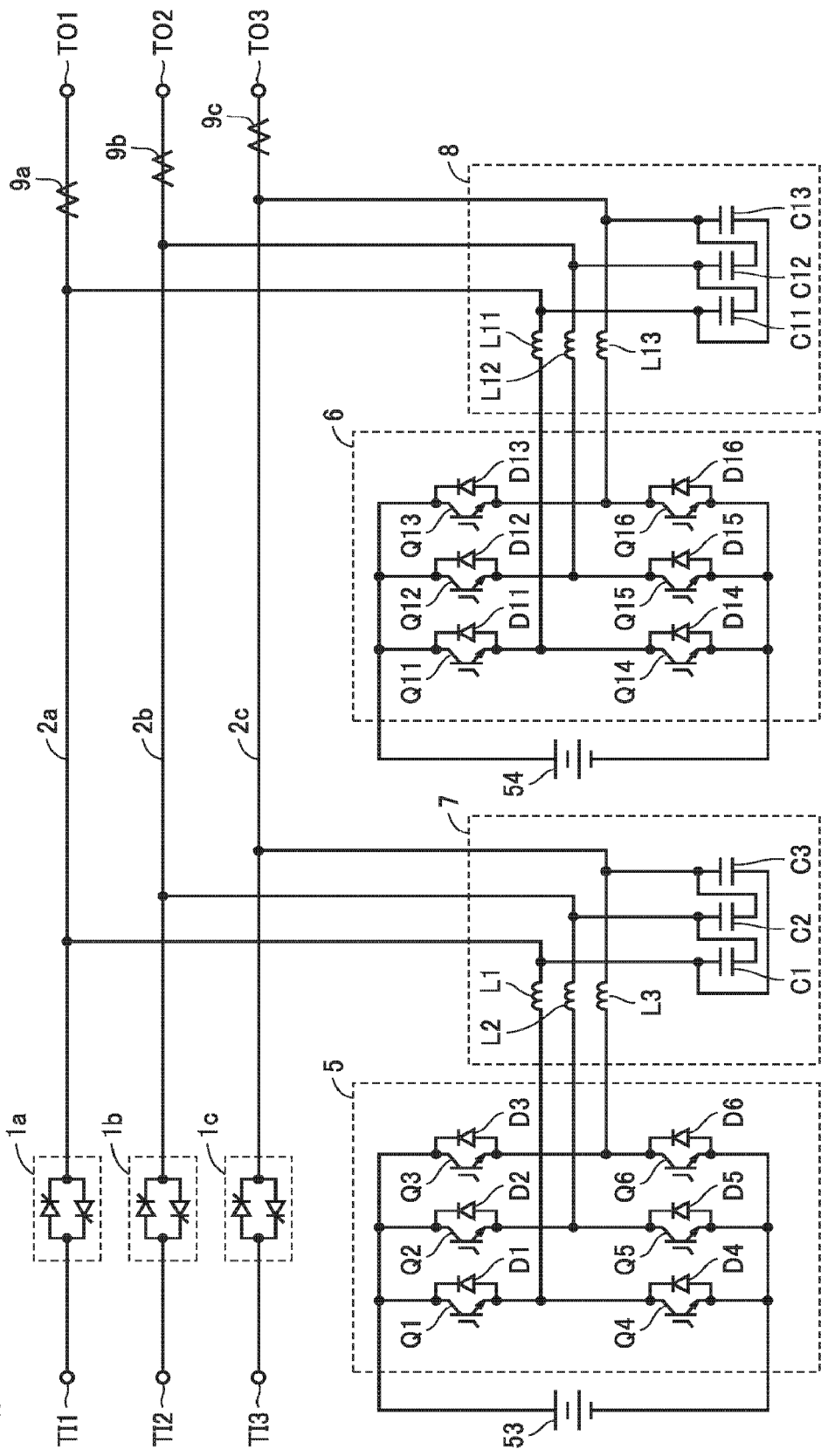
FIG. 2 is a circuit diagram showing configurations of power converters and filters shown in FIG. 1.

FIG. 2 is a circuit diagram showing configurations of power converters 5 and 6 and filters 7 and 8. With reference to FIG. 2, power converter 5 includes transistors Q1 to Q6 and diodes D1 to D6. Filter 7 includes reactors L1 to L3 and capacitors C1 to C3. Each of transistors Q1 to Q6 is, for example, an insulated gate bipolar transistor (IGBT).

Transistors Q1 to Q3 have collectors connected together to the positive electrode of DC power supply 53 and emitters connected respectively to the collectors of transistors Q4 to Q6, and emitters of transistors Q4 to Q6 are connected together to the negative electrode of DC power supply 53. Diodes D1 to D6 are connected respectively in anti-parallel with transistors Q1 to Q6.

Each of transistors Q1 to Q6 is controlled to be turned on/off by control circuit 3 of FIG. 1. When AC power supply 51 does not supply three-phase AC power normally, control circuit 3 turns on transistors Q1 to Q6 for each predetermined period of time in a predetermined order to convert the output voltage of DC power supply 53 into a three-phase AC voltage.

Reactors L1 to L3 have first terminals connected respectively to the emitters of transistors Q1 to Q3 and second terminals connected respectively to AC buses 2a to 2c. Capacitors C1 to C3 have first electrodes connected respectively to AC buses 2a to 2c and second electrodes connected respectively to AC buses 2b, 2c, and 2a. Reactors L1 to L3 and capacitors C1 to C3 constitute a low pass filter, and the low pass filter converts a rectangular-wave AC voltage generated by transistors Q1 to Q6 into a sine-wave AC voltage and supplies the sine-wave AC voltage to AC buses 2a to 2c.

Power converter 6 includes transistors Q11 to Q16 and diodes D11 to D16. Filter 8 includes reactors L11 to L13 and capacitors C11 to C13. Each of transistors Q11 to Q16 is, for example, an IGBT.

Transistors Q11 to Q13 have collectors connected together to the positive electrode of lithium-ion battery 54 and emitters connected respectively to the collectors of transistors Q14 to Q16, and emitters of transistors Q14 to Q16 are connected together to the negative electrode of lithium-ion battery 54. Diodes D11 to D16 are connected respectively in anti-parallel with transistors Q11 to Q16.

Reactors L11 to L13 have first terminals connected respectively to the emitters of transistors Q11 to Q13 and second terminals connected respectively to AC buses 2a to 2c. Capacitors C11 to C13 have first electrodes connected respectively to AC buses 2a to 2c and second electrodes connected respectively to AC buses 2b, 2c, and 2a.

Reactors L11 to L13 and capacitors C11 to C13 constitute a low pass filter, and the low pass filter converts a rectangular-wave AC voltage generated in transistors Q11 to Q16 into a sine-wave AC voltage and supplies the sine-wave AC voltage to AC buses 2a to 2c.

Each of transistors Q11 to Q16 is controlled to be turned on/off by control circuit 4 of FIG. 1. When load 52 is performing regeneration running, control circuit 4 turns on transistors Q11 to Q16 for each predetermined period of time in a predetermined order and converts the regenerated power (three-phase AC power) supplied from AC buses 2a to 2c via filter 8 into DC power to charge lithium-ion battery 54.

For example, the phase of a three-phase AC voltage that appears in the emitters of transistors Q11 to Q13 when transistors Q11 to Q16 are controlled to be turned on/off is delayed from the phase of the three-phase AC voltage that appears in AC buses 2a to 2c, thereby causing a current to flow from AC buses 2a to 2c to lithium-ion battery 54 to charge lithium-ion battery 54.

When load 52 is performing power running, control circuit 4 turns on transistors Q11 to Q16 for each predetermined period of time in a predetermined order, and converts the DC power of lithium-ion battery 54 into three-phase AC power to discharge lithium-ion battery 54.

For example, the phase of a three-phase AC voltage that appears in the emitters of transistors Q11 to Q13 when transistors Q11 to Q16 are controlled to be turned on/off is advanced from the phase of a three-phase AC voltage that appears in AC buses 2a to 2c, thereby causing a current to flow from lithium-ion battery 54 to AC buses 2a to 2c to discharge lithium-ion battery 54.

The operation of this uninterruptible power supply device will now be described. When AC power supply 51 supplies three-phase AC power normally, control circuit 3 turns on switches 1a to 1c, so that the three-phase AC power from AC power supply 51 is supplied to load 52 via switches 1a to 1c and AC buses 2a to 2c. In this case, power converter 5 is brought to the standby state.

When load 52 performs regeneration running, regenerated power is generated in load 52, causing an effective current to flow from load 52 to AC buses 2a to 2c. The effective current is detected by current detectors 9a to 9c and control circuit 4, so that control circuit 4 causes power converter 6 to execute the charge mode. This causes the regenerated power generated in load 52 to be converted into DC power by power converter 6 to be stored in lithium-ion battery 54.

When load 52 performs power running, an effective current flows from AC buses 2a to 2c into load 52. The effective current is detected by current detectors 9a to 9c and control circuit 4, so that control circuit 4 causes power converter 6 to execute the discharge mode. That is to say, the DC power of lithium-ion battery 54 is converted into three-phase AC power by power converter 6, and the three-phase AC power is supplied to load 52 via filter 8 and AC buses 2a to 2c. This allows effective use of the regenerated power generated in load 52, increasing the input efficiency of the uninterruptible power supply device. Further, as a result of the discharge of lithium-ion battery 54, the regenerated power to be generated in load 52 next is prepared to be stored in lithium-ion battery 54.

When the three-phase AC power from AC power supply 51 is abnormal, control circuit 3 turns off switches 1a to 1c and the DC power from DC power supply 53 is converted into three-phase AC power by power converter 5, and the three-phase AC power is supplied to load 52 via filter 7 and AC buses 2a to 2c. The operation of load 52 can thus be continued during a period in which DC power supply 53 supplies DC power.

Also in this case, when load 52 is performing regeneration running, the regenerated power generated in load 52 is converted into DC power, and the DC power is stored in lithium-ion battery 54; when load 52 is performing power running, the DC power of lithium-ion battery 54 is converted into three-phase AC power, and the three-phase AC power is supplied to load 52.

As described above, in Embodiment 1, AC buses 2a to 2c are connected to lithium-ion battery 54 via power converter 6, lithium-ion battery 54 is charged when load 52 is performing regeneration running and is discharged when the load is performing power running. A return of the regenerated power generated in load 52 to AC power supply 51 can thus be prevented or reduced. In addition, the regenerated power generated in load 52 can be used effectively, thus improving the efficiency of the uninterruptible power supply device.

An electric double layer capacitor or an electrolytic capacitor may be provided in place of lithium-ion battery 54.

Further, although DC power supply 53 for driving power converter 5 is provided in Embodiment 1, a storage battery (power storage device) may be provided as DC power supply 53. When the three-phase AC voltage supplied from AC power supply 51 is normal, control circuit 3 controls power converter 5 such that the voltage between the terminals of the storage battery reaches a target voltage. Power converter 5 is controlled by control circuit 3 to convert three-phase AC power supplied from AC power supply 51 via switches 1a to 1c into DC power and store the DC power in the storage battery.

When the three-phase AC voltage supplied from AC power supply 51 is abnormal, power converter 5 converts the DC power of the storage battery into three-phase AC power and supplies the three-phase AC power to load 52 via filter 7 and AC buses 2a to 2c. Even when a power failure occurs, thus, the operation of load 52 can be continued during a period in which storage battery stores DC power. A capacitor may be provided in place of the storage battery.

Advantageously, the storage battery is inexpensive compared with lithium-ion battery 54; the storage battery is disadvantageous in that it deteriorates severely due to charge and discharge and cannot be charged and discharged many times. Since large power is required during a power failure though a power failure occurs less frequently, an inexpensive storage battery is preferably used as the battery for storing DC power used during a power failure.

Embodiment 2

An uninterruptible power supply device is frequently connected with a load that does not perform regeneration running, and is less frequently connected with a load that performs regeneration running. When the load that does not perform regeneration running is connected to the uninterruptible power supply device, the uninterruptible power supply device of Embodiment 1 does not use control circuit 4, power converter 6, filter 8, current detectors 9a to 9c, and lithium-ion battery 54, leading to waste. Embodiment 2 aims to solve this problem.

Figure 3:
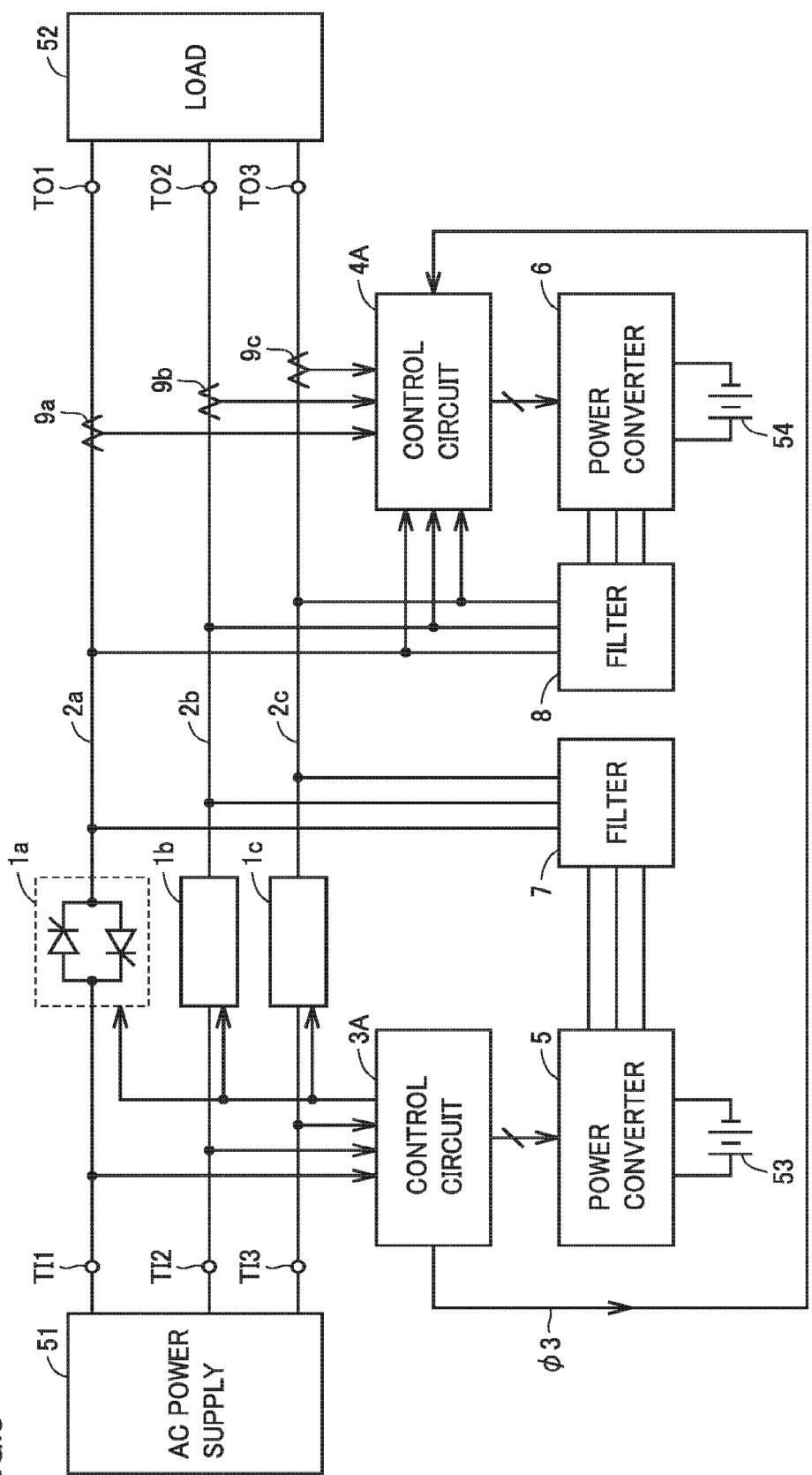
FIG. 3 is a circuit block diagram showing a configuration of an uninterruptible power supply device according to Embodiment 2 of the present invention.

FIG. 3 is a circuit block diagram showing a configuration of an uninterruptible power supply device according to Embodiment 2 of the present invention, which is compared with FIG. 1. With reference to FIG. 3, this uninterruptible power supply device differs from the uninterruptible power supply device of FIG. 1 in that control circuits 3 and 4 are replaced respectively by control circuits 3A and 4A.

Control circuit 3A determines whether a three-phase AC voltage supplied from AC power supply 51 is normal, and brings an abnormality detection signal φ3 to "L" level that is the deactivation level when the three-phase AC voltage is normal and brings abnormality detection signal φ3 to "H" level that is an activation level when the three-phase AC voltage is not normal.

In other words, abnormality detection signal φ3 enters "L" level that is the deactivation level when the three-phase AC power supplied from AC power supply 51 is normal, and abnormality detection signal φ3 enters "H" level that is the activation level when the three-phase AC power supplied from AC power supply 51 is not normal.

Control circuit 4A determines whether load 52 is performing regeneration running or power running based on the output signals of current detectors 9a to 9c as in the case of control circuit 4 of FIG. 1. Control circuit 4A operates similarly to control circuit 4 of FIG. 1 (i.e., executes the first mode) when regeneration running of load 52 is performed within a predetermined period of time. Control circuit 4A causes power converter 6 to execute the charge mode to charge lithium-ion battery 54 when load 52 is performing regeneration running, and causes power converter 6 to execute the discharge mode to discharge lithium-ion battery 54 when load 52 is performing power running. This is because when a time interval in which regeneration running of load 52 is performed is within the predetermined period of time, load 52 that performs regeneration running is estimated to be connected to output terminals TO1 to TO3.

When regeneration running of load 52 is not performed within the predetermined period of time, control circuit 4A operates similarly to control circuit 3 of FIG. 1 (i.e., executes the second mode). That is to say, control circuit 4A causes power converter 6 to execute the charge mode to charge lithium-ion battery 54 when abnormality detection signal φ3 is at "L" level that is the deactivation level, and causes power converter 6 to execute the discharge mode to discharge lithium-ion battery 54 when abnormality detection signal φ3 is at "H" level that is the activation level. This is because when regeneration running of load 52 is not performed even after a lapse of the predetermined period of time, it is estimated that load 52 that performs power running alone is connected. The other configuration and operation are the same as those of Embodiment 1, which will not be described repetitively.

Embodiment 2 can achieve effects similar to those of Embodiment 1, and even when load 52 that performs power running alone is connected, power converter 6, lithium-ion battery 54, and the like can be used effectively, increasing the power that can be supplied during a power failure.

Embodiment 3

In Embodiment 2, whether load 52 is performing regeneration running or power running is determined based on the detection results of current detectors 9a to 9c, and when the period of time in which load 52 is not performing regeneration running exceeds the predetermined period of time, lithium-ion battery 54 is used as a battery for supplying power during a power failure. However, when whether load 52 performs regeneration running is evident without operating load 52, the operation of determining whether the period of time in which whether load 52 is not performing regeneration running exceeds the predetermined period of time leads to waste, and control circuit 4A may wastefully consume current. Embodiment 3 aims to solve this problem.

Figure 4:
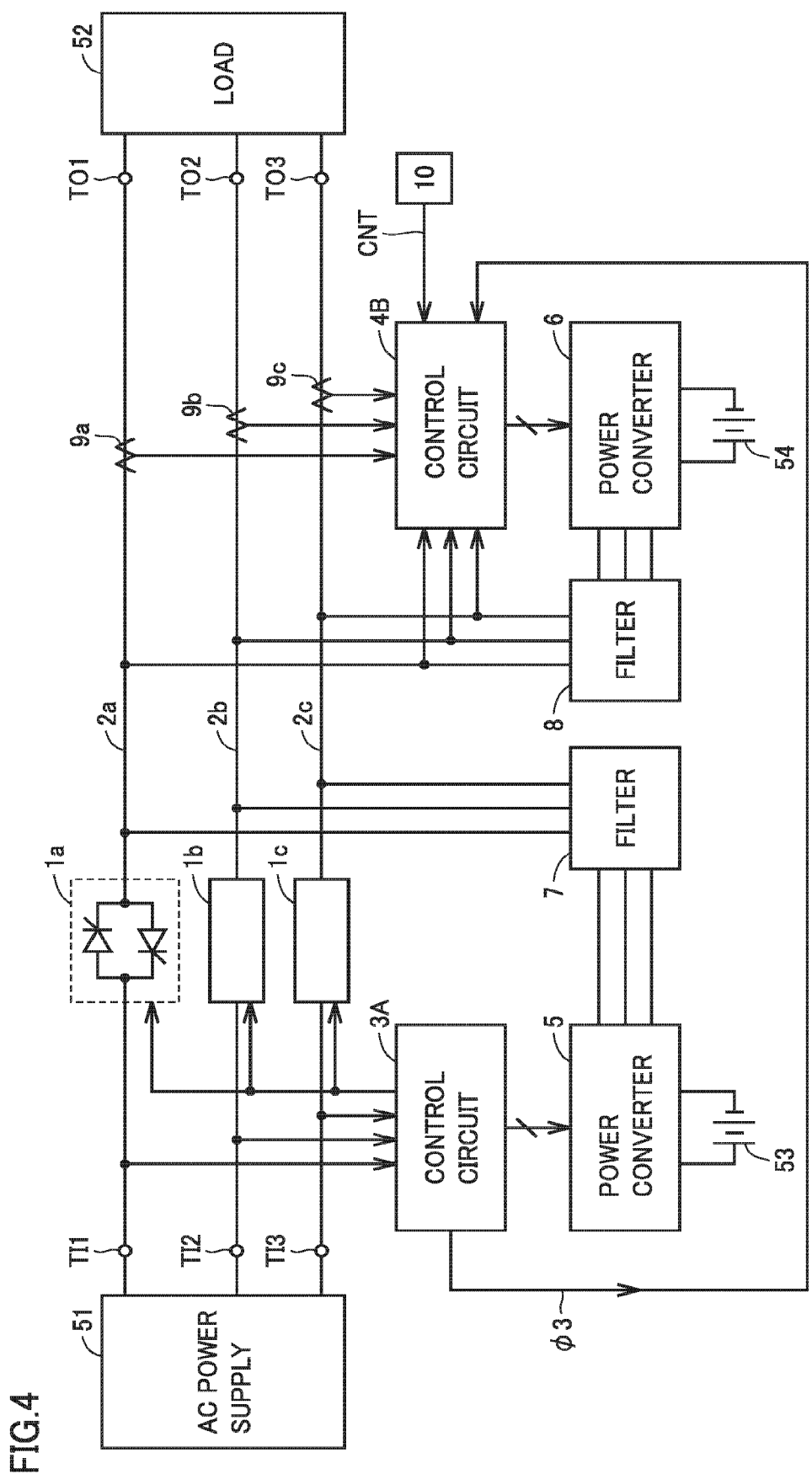
FIG. 4 is a circuit block diagram showing a configuration of an uninterruptible power supply device according to Embodiment 3 of the present invention.

FIG. 4 is a circuit block diagram showing a configuration of an uninterruptible power supply device according to Embodiment 3 of the present invention, which is compared with FIG. 3. With reference to FIG. 4, this uninterruptible power supply device differs from the uninterruptible power supply device of FIG. 3 in that control circuit 4A is replaced by a control circuit 4B and that a setting unit 10 is added.

Setting unit 10 includes, for example, a button operated by a user of the uninterruptible power supply device and is used to determine whether load 52 is configured to perform regeneration running. Setting unit 10 brings a control signal CNT to "L" level when it is set that load 52 is configured to perform regeneration running. Setting unit 10 brings control signal CNT to "H" level when it is set that load 52 is not configured to perform regeneration running. Setting unit 10 forms a selection unit that selects any one mode of a first mode and a second mode.

When control signal CNT is at "L" level (i.e., when the first mode is selected), control circuit 4B determines whether load 52 is performing regeneration running or power running based on the output signals of current detectors 9a to 9c as in control circuit 4 of FIG. 1. Control circuit 4B causes power converter 6 to execute the charge mode to charge lithium-ion battery 54 when load 52 is performing regeneration running, and causes power converter 6 to execute the discharge mode to discharge lithium-ion battery 54 when load 52 is performing power running.

When control signal CNT is at "H" level (i.e., when the second mode is selected), control circuit 4B operates similarly to control circuit 3 of FIG. 1. That is to say, control circuit 4B causes power converter 6 to execute the charge mode to charge lithium-ion battery 54 when abnormality detection signal φ3 is at "H" level that is the deactivation level, and causes power converter 6 to execute the discharge mode to discharge lithium-ion battery 54 when abnormality detection signal φ3 is at "H" level that is the activation level. The other configuration and operation are the same as those of Embodiment 1, which will not be described repetitively.

Embodiment 3 achieves the same effects as those of Embodiment 2, and when load 52 that performs power running alone is connected, the operation of control circuit 4B can be simplified, thus reducing the current consumed by control circuit 4B.

Although lithium-ion battery 54 is used as the battery for storing the power to be used during a power failure when control signal CNT is brought to "H" level in Embodiment 3, the present invention is not limited to this. When load 52 performs regeneration running even in the case in which control signal CNT has been brought to "H" level, lithium-ion battery 54 can be used as the battery for storing regenerated power when load 52 performs regeneration running. In this modification example, even when any one load of the load that performs regeneration running and the load that does not perform regeneration running is connected and one load is subsequently changed to the other load, the operation of control circuit 4B can be switched without operating setting unit 10. Even when the operation of setting unit 10 is forgot in the case in which one load has been changed to the other load, the operation of control circuit 4B can be switched automatically.

Embodiment 4

Figure 5:
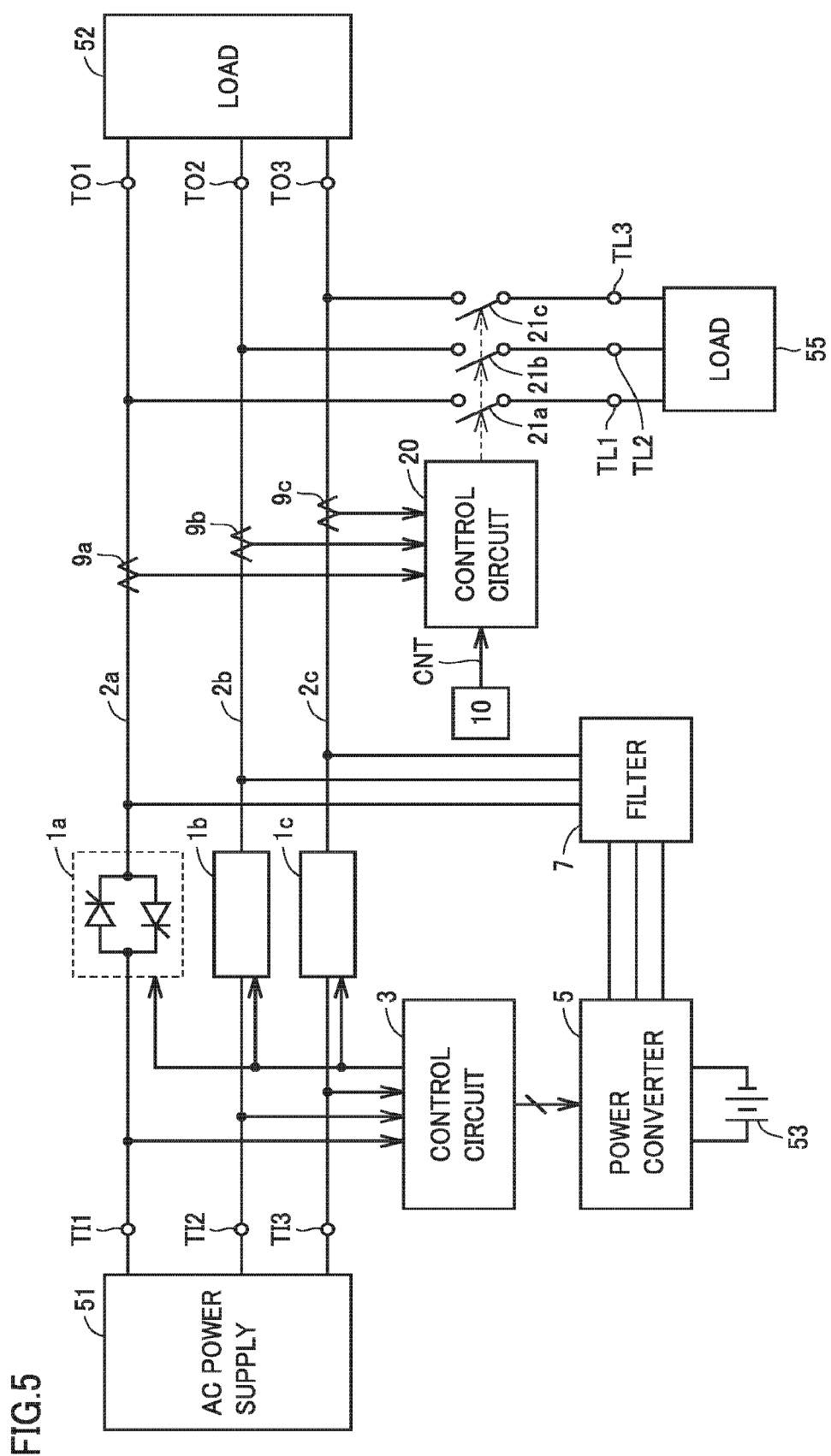
FIG. 5 is a circuit block diagram showing a configuration of an uninterruptible power supply device according to Embodiment 4 of the present invention.

FIG. 5 is a circuit block diagram showing a configuration of an uninterruptible power supply device according to Embodiment 4 of the present invention, which is compared with FIG. 1. With reference to FIG. 5, this uninterruptible power supply device differs from the uninterruptible power supply device of FIG. 1 in that setting unit 10, a control circuit 20, switches 21a to 21c, and load terminals TL1 to TL3 are provided in place of control circuit 4, power converter 6, and filter 8.

Load terminals TL1 to TL3 are connected with a load 55 caused to consume regenerated power generated in load 52. For example, load 55 includes three resistance elements or three inductors. The three resistance elements (or three inductors) have first terminals connected respectively to load terminals TL1 to TL3 and second terminals connected to each other.

Switches 21a to 21c have first terminals connected respectively to output terminals TO1 to TO3 and second terminals connected respectively to load terminals TL1 to TL3. Switches 21a to 21c are controlled by control circuit 20.

Setting unit 10 includes, for example, a button operated by a user of the uninterruptible power supply device and is used to determine whether load 52 is configured to perform regeneration running. Setting unit 10 brings a control signal CNT to "L" level when the user sets load 52 as being a load that performs regeneration running. Setting unit 10 brings control signal CNT to "H" level when the user sets load 52 as not being a load that performs regeneration running.

When control signal CNT is at "L" level, control circuit 20 determines whether load 52 is performing regeneration running or power running based on the output signals of current detectors 9a to 9c as in control circuit 4 of FIG. 1. Control circuit 20 turns on switches 21a to 21c such that the regenerated power is consumed in load 55 when load 52 is performing regeneration running, and turns off switches 21a to 21c such that load 55 is electrically isolated from load 52 when load 52 is performing power running. When control signal CNT is at "H" level, control circuit 20 brings switches 21a to 21c to off state. The other configuration and operation are the same as those of Embodiment 1, which will not be described repetitively.

Since switches 21a to 21c are turned on such that the regenerated power is consumed in load 55 when the regenerated power is generated in load 52 in Embodiment 4, a return of regenerated power to AC power supply 51 can be prevented or reduced. Even when an independent power generator is used as AC power supply 51, thus, a failure of the independent power generator due to the regenerated power generated in load 52 can be prevented. Further, when load 52 that performs power running alone is connected, setting unit 10 is used to bring control signal CNT to "H" level, simplifying the operation of control circuit 20, which reduces the current consumed by control circuit 20.

Although switches 21a to 21c are brought to off state when control signal CNT is brought to "H" level in Embodiment 4, the present invention is not limited to this. Also in the case where control signal CNT has been brought to "H" level, switches 21a to 21c can be turned on when load 52 performs regeneration running. In this modification example, even when any one load of the load that performs regeneration running and the load that does not perform regeneration running is connected and one load is subsequently changed to the other load, the operation of control circuit 4B can be switched without operating setting unit 10. Even when the operation of setting unit 10 is forgot in the case where one load has been changed to the other load, thus, the operation of control circuit 20 can be switched automatically.

Embodiment 5

Figure 6:
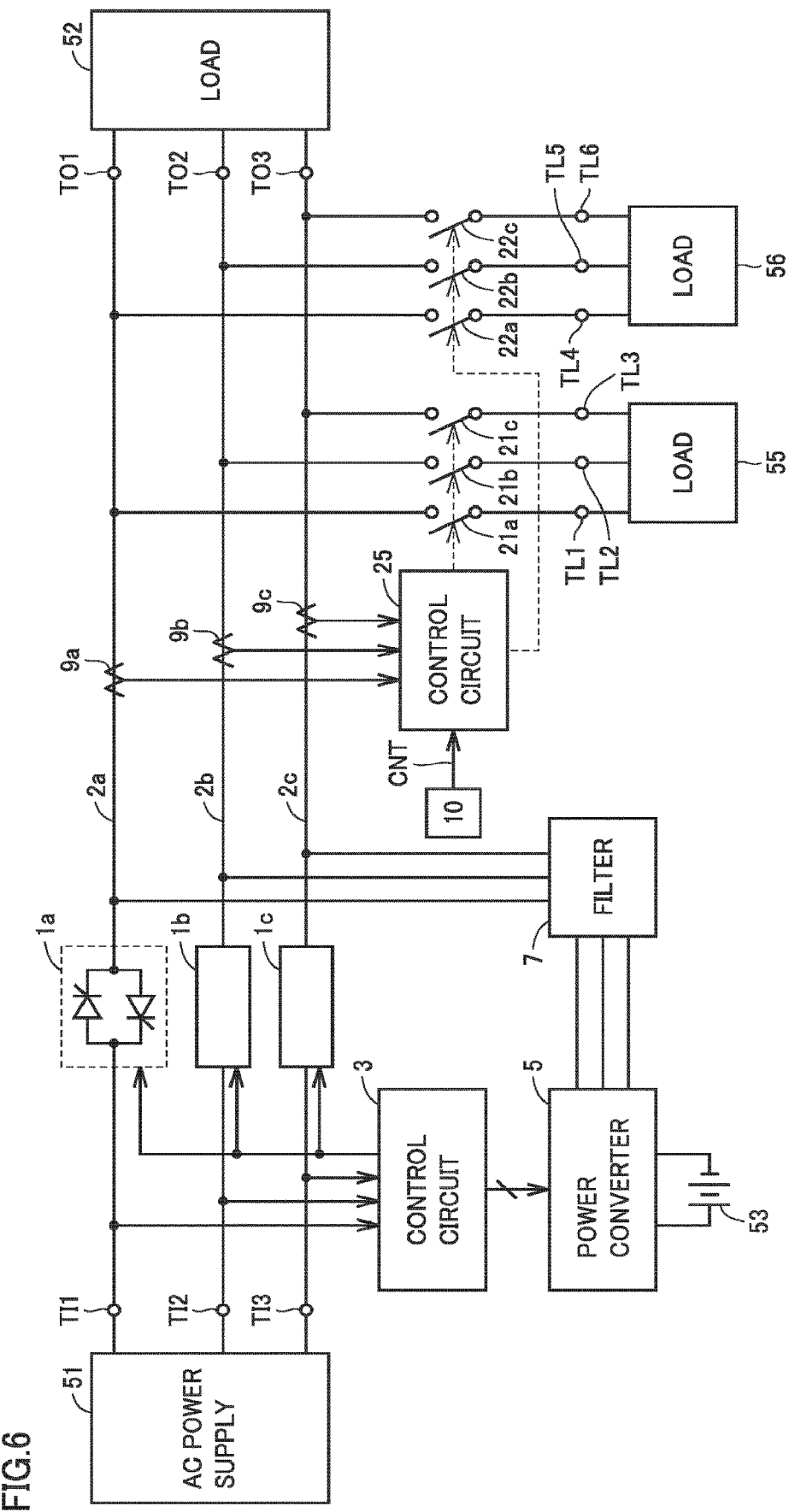
FIG. 6 is a circuit block diagram showing a configuration of an uninterruptible power supply device according to Embodiment 5 of the present invention.

FIG. 6 is a circuit block diagram showing a configuration of an uninterruptible power supply device according to Embodiment 5 of the present invention, which is compared with FIG. 5. With reference to FIG. 6, this uninterruptible power supply device differs from the uninterruptible power supply device of FIG. 5 in that control circuit 20 is replaced by control circuit 25 and that switches 22a to 22c and load terminals TL4 to TL6 are added.

Load terminals TL4 to TL6 are connected with a load 56 caused to consume the regenerated power generated in load 52. For example, load 56 includes three resistance elements or three inductors. The three resistance elements (or three inductors) have first terminals each connected to a corresponding one of load terminals TL4 to TL6 and second terminals connected to each other.

Switches 22a to 22c have first terminals connected respectively to output terminals TO1 to TO3 and second terminals connected respectively to load terminals TL4 to TL6. Switches 21a to 21c and 22a to 22c are controlled by control circuit 25.

When control signal CNT is at "L" level, control circuit 25 obtains an effective current flowing through load 52 based on the output signals of current detectors 9a to 9c, and determines that load 52 is performing regeneration running when the effective current has a negative value (i.e., when the effective current flows out of load 52) and determines that load 52 is performing power running when the effective current has a positive value (i.e., when the effective current flows into load 52).

In the case in which load 52 is performing regeneration running, control circuit 25 turns on switches 21a to 21c alone among switches 21a to 21c and 22a to 22c when the absolute value of the effective current is smaller than a threshold current and turns on all of switches 21a to 21c and 22a to 22c when the absolute value of the effective current is greater than the threshold current. This allows the regenerated current generated in load 52 to be consumed in load 55 alone when the regenerated current generated in load 52 is relatively small and allows the regenerated current to be consumed in loads 55 and 56 when the regenerated current generated in load 52 is relatively large. The other configuration and operation are the same as those of Embodiment 4, which will not be described repetitively.

Embodiment 5 achieves the same effects as those of Embodiment 4. Additionally, since the number of loads for the consumption of regenerated power is changed depending on the magnitude of the regenerated current generated in load 52, Embodiment 5 can reduce variations in the voltages at output terminals TO1 to TO3 associated with on/off of switches 21a to 21c and 22a to 22c.

Although two pairs of switches 21a to 21c and 22a to 22c and loads 55 and 56 are provided in Embodiment 5, the present invention is not limited to this. Three or more pairs of switches and loads may be provided, and the number of switches that are turned on can be changed depending on the magnitude of the regenerated current generated in load 52.

It should be construed that the embodiments disclosed herein are given by way of illustration in all respects, not by way of limitation. It is therefore intended that the scope of the present invention is defined by claims, not only by the embodiments described above, and encompasses all modifications and variations equivalent in meaning and scope to the claims.

REFERENCE SIGNS LIST

TI1 to TI3 input terminal, TO1 to TO3 output terminal, 1a to 1c, 21a to 21c, 22a to 22c switch, 2a to 2c AC bus, 3, 3A, 4, 4A, 4B, 20, 25 control circuit, 5, 6 power converter, 7, 8 filter, 9a to 9c current detector, Q1 to Q6, Q11 to Q16 transistor, D1 to D6, D11 to D16 diode, L1 to L3, L11 to L13 reactor, C1 to C3, C11 to C13 capacitor, 10 setting unit, 51 AC power supply, 52, 55, 56 load, 53 DC power supply, 54 lithium-ion battery.

The invention claimed is:

1. An uninterruptible power supply device that (i) supplies AC power from an AC power supply to a load in a first case in which the AC power supply supplies AC power normally and (ii) converts DC power from a DC power supply into AC power and supplies the AC power to the load in a second case in which the AC power supply does not supply AC power normally, the uninterruptible power supply device comprising:
a switch having a first electrode that receives AC power from the AC power supply and configured to be turned on in the first case and turned off in the second case;
an AC bus connected between a second electrode of the switch and the load;
a first power converter configured to convert DC power from the DC power supply into AC power and output the AC power to the AC bus in the second case;
a second power converter having a charge mode in which the second power converter converts AC power received from the AC bus into DC power and supplies the DC power to a first power storage device, and a discharge mode in which the second power converter converts DC power of the first power storage device into AC power and outputs the AC power to the AC bus, the second power converter being different from the first power converter; and
a control circuit configured to execute a first mode,
in the first case, AC power from the AC power supply being supplied to the load via the AC bus,
a first terminal of the AC bus being connected to the second electrode and being not directly connected to the load,
a second terminal of the AC bus being connected to the load,
the first and the second power converters being connected to the AC bus, in the first mode, the control circuit causing the second power converter to execute the charge mode when the load is performing regeneration running, and
causing the second power converter to execute the discharge mode when the load is performing power running.

2. The uninterruptible power supply device according to claim 1, further comprising a current detector configured to detect a current flowing through the AC bus,
wherein in the first mode, the control circuit
determines whether the load is performing regeneration running or power running based on a detection result of the current detector,
causes the second power converter to execute the charge mode when determining that the load is performing regeneration running, and
causes the second power converter to execute the discharge mode when determining that the load is performing power running.

3. The uninterruptible power supply device according to claim 2, wherein
the uninterruptible power supply device
supplies three-phase AC power from the AC power supply to the load in the first case in which the AC power supply supplies three-phase AC power normally, and
converts DC power from the DC power supply into three-phase AC power and supplies the three-phase AC power to the load in the second case in which the AC power supply does not supply three-phase AC power normally,
the uninterruptible power supply device comprises three switches, three AC buses, and three current detectors,
each of the three switches has a first electrode that receives three-phase AC power from the AC power supply and a second electrode connected to a corresponding one of first terminals of the three AC buses, and second terminals of the three AC buses are connected to the load,
the first power converter converts in the second case, DC power from the DC power supply into three-phase AC power and outputs the three-phase AC power to the three AC buses,
in the charge mode, the second power converter converts three-phase AC power received from the three AC buses into DC power and supplies the DC power to the first power storage device, and in the discharge mode, the second power converter converts DC power of the first power storage device into three-phase AC power and outputs the three-phase AC power to the three AC buses,
each of the three current detectors detects a corresponding one of three-phase AC currents flowing through the three AC buses,
in the first mode, the control circuit
subjects the three-phase AC currents detected by the three current detectors to three-phase to two-phase conversion to obtain an effective current and a reactive current,
determines that the load is performing power running when the effective current flows into the load, and
determines that the load is performing regeneration running when the effective current flows out of the load.

4. The uninterruptible power supply device according to claim 1, wherein the control circuit executes the first mode when a period of time in which the load does not perform regeneration running is shorter than a predetermined period of time, and executes a second mode when the period of time in which the load does not perform regeneration running is longer than the predetermined period of time, and
in the second mode, the control circuit causes the second power converter to execute the charge mode in the first case and causes the second power converter to execute the discharge mode in the second case.

5. The uninterruptible power supply device according to claim 1, further comprising a selection unit configured to select any one mode of the first mode and the second mode, wherein
when the first mode is selected, the control circuit executes the first mode, and
when the second mode is selected, the control circuit causes the second power converter to execute the charge mode in the first case and causes the second power converter to execute the discharge mode in the second case.

6. The uninterruptible power supply device according to claim 5, wherein even in a case in which the second mode has been selected, the control circuit executes the first mode when the load performs regeneration running.

7. The uninterruptible power supply device according to claim 1, wherein
the DC power supply comprises a second power storage device, and
the first power converter converts AC power received from the AC bus into DC power and supplies the DC power to the second power storage device in the first case, and converts DC power of the second power storage device into AC power and outputs the AC power to the AC bus in the second case.

8. The uninterruptible power supply device according to claim 1, wherein the first power storage device includes a lithium-ion battery.

9. The uninterruptible power supply device according to claim 1, wherein the first power storage device includes an electric double layer capacitor.

10. The uninterruptible power supply device according to claim 1, wherein the first power storage device includes an electrolytic capacitor.

11. An uninterruptible power supply device that (i) supplies AC power from an AC power supply to a load in a first case in which the AC power supply supplies AC power normally and (ii) converts DC power from a DC power supply into AC power and supplies the AC power to the load in a second case in which the AC power supply does not supply AC power normally, the uninterruptible power supply device comprising:
a switch having a first electrode that receives AC power from the AC power supply and configured to be turned on in the first case and turned off in the second case;
an AC bus connected between a second electrode of the switch and the load;
a first power converter configured to convert DC power from the DC power supply into AC power and output the AC power to the AC bus in the second case;
a second power converter having a charge mode in which the second power converter converts AC power received from the AC bus into DC power and supplies the DC power to a first power storage device, and a discharge mode in which the second power converter converts DC power of the first power storage device into AC power and outputs the AC power to the AC bus;
a control circuit configured to execute a first mode; and
a current detector configured to detect a current flowing through the AC bus,
in the first mode, the control circuit causing the second power converter to execute the charge mode when the load is performing regeneration running, and causing the second power converter to execute the discharge mode when the load is performing power running,
wherein in the first mode, the control circuit
determines whether the load is performing regeneration running or power running based on a detection result of the current detector,
causes the second power converter to execute the charge mode when determining that the load is performing regeneration running, and
causes the second power converter to execute the discharge mode when determining that the load is performing power running,
wherein:
the uninterruptible power supply device
supplies three-phase AC power from the AC power supply to the load in the first case in which the AC power supply supplies three-phase AC power normally, and
converts DC power from the DC power supply into three-phase AC power and supplies the three-phase AC power to the load in the second case in which the AC power supply does not supply three-phase AC power normally,
the uninterruptible power supply device comprises three switches, three AC buses, and three current detectors,
each of the three switches has a first electrode that receives three-phase AC power from the AC power supply and a second electrode connected to a corresponding one of first terminals of the three AC buses, and second terminals of the three AC buses are connected to the load,
the first power converter converts in the second case, DC power from the DC power supply into three-phase AC power and outputs the three-phase AC power to the three AC buses,
in the charge mode, the second power converter converts three-phase AC power received from the three AC buses into DC power and supplies the DC power to the first power storage device, and in the discharge mode, the second power converter converts DC power of the first power storage device into three-phase AC power and outputs the three-phase AC power to the three AC buses,
each of the three current detectors detects a corresponding one of three-phase AC currents flowing through the three AC buses,
in the first mode, the control circuit
subjects the three-phase AC currents detected by the three current detectors to three-phase to two-phase conversion to obtain an effective current and a reactive current,
determines that the load is performing power running when the effective current flows into the load, and
determines that the load is performing regeneration running when the effective current flows out of the load.

12. An uninterruptible power supply device that (i) supplies AC power from an AC power supply to a load in a first case in which the AC power supply supplies AC power normally and (ii) converts DC power from a DC power supply into AC power and supplies the AC power to the load in a second case in which the AC power supply does not supply AC power normally, the uninterruptible power supply device comprising:
a switch having a first electrode that receives AC power from the AC power supply and configured to be turned on in the first case and turned off in the second case;
an AC bus connected between a second electrode of the switch and the load;
a first power converter configured to convert DC power from the DC power supply into AC power and output the AC power to the AC bus in the second case;
a second power converter having a charge mode in which the second power converter converts AC power received from the AC bus into DC power and supplies the DC power to a first power storage device, and a discharge mode in which the second power converter converts DC power of the first power storage device into AC power and outputs the AC power to the AC bus; and
a control circuit configured to execute a first mode,
in the first mode, the control circuit causing the second power converter to execute the charge mode when the load is performing regeneration running, and causing the second power converter to execute the discharge mode when the load is performing power running,
wherein:
the control circuit executes the first mode when a period of time in which the load does not perform regeneration running is shorter than a predetermined period of time, and executes a second mode when the period of time in which the load does not perform regeneration running is longer than the predetermined period of time, and
in the second mode, the control circuit causes the second power converter to execute the charge mode in the first case and causes the second power converter to execute the discharge mode in the second case.

13. An uninterruptible power supply device that (i) supplies AC power from an AC power supply to a load in a first case in which the AC power supply supplies AC power normally and (ii) converts DC power from a DC power supply into AC power and supplies the AC power to the load in a second case in which the AC power supply does not supply AC power normally, the uninterruptible power supply device comprising:
a switch having a first electrode that receives AC power from the AC power supply and configured to be turned on in the first case and turned off in the second case;
an AC bus connected between a second electrode of the switch and the load;
a first power converter configured to convert DC power from the DC power supply into AC power and output the AC power to the AC bus in the second case;
a second power converter having a charge mode in which the second power converter converts AC power received from the AC bus into DC power and supplies the DC power to a first power storage device, and a discharge mode in which the second power converter converts DC power of the first power storage device into AC power and outputs the AC power to the AC bus;
a control circuit configured to execute a first mode; and
a selection unit configured to select any one mode of the first mode and the second mode, in the first mode, the control circuit causing the second power converter to execute the charge mode when the load is performing regeneration running, and causing the second power converter to execute the discharge mode when the load is performing power running wherein
- when the first mode is selected, the control circuit executes the first mode,
- when the second mode is selected, the control circuit causes the second power converter to execute the charge mode in the first case and causes the second power converter to execute the discharge mode in the second case, and
- even in a case in which the second mode has been selected, the control circuit executes the first mode when the load performs regeneration running.

* * * * *